United States Patent [19]

Mischenko

[11] Patent Number: 5,982,881
[45] Date of Patent: Nov. 9, 1999

[54] RADIOTELEPHONE HANDSET HAVING A FACEPLATE TO ACCOMMODATE A PLURALITY OF DISTINCTIVE TELEPHONE APPEARANCES

[76] Inventor: Nicholas Mischenko, 127 Marcella Rd., Mt. Prospect, Ill. 60056

[ * ] Notice: This patent is subject to a terminal disclaimer.

[21] Appl. No.: 08/742,379

[22] Filed: Nov. 1, 1996

Related U.S. Application Data

[63] Continuation-in-part of application No. 29/055,807, May 2, 1996, Pat. No. Des. 388,078, which is a continuation-in-part of application No. 29/052,877, Oct. 17, 1995, abandoned, and a continuation-in-part of application No. 08/533,977, Sep. 26, 1995.

[51] Int. Cl.⁶ .................................................. H04M 1/00
[52] U.S. Cl. ............................................ 379/433; 379/434
[58] Field of Search .................................... 379/433, 434, 379/428, 429; 455/59, 90

[56] References Cited

U.S. PATENT DOCUMENTS

| | | | |
|---|---|---|---|
| D. 300,742 | 4/1989 | Soren et al. ............................. | D14/148 |
| D. 309,901 | 8/1990 | Caeser ..................................... | D14/244 |
| 3,838,229 | 9/1974 | Morrell et al. ........................... | 179/100 |
| 4,124,785 | 11/1978 | Seretny et al. .......................... | 179/103 |
| 4,292,481 | 9/1981 | Barnes et al. ........................... | 179/178 |
| 4,433,216 | 2/1984 | Isaacs ..................................... | 179/178 |
| 4,582,966 | 4/1986 | Sutton et al. ........................... | 179/185 |
| 5,086,463 | 2/1992 | Vesely et al. ........................... | 379/388 |
| 5,202,912 | 4/1993 | Breeden et al. ........................ | 379/57 |
| 5,235,636 | 8/1993 | Takagi et al. ........................... | 379/368 |
| 5,303,291 | 4/1994 | Takagi et al. ........................... | 379/433 |
| 5,357,570 | 10/1994 | Tomura et al. ........................ | 379/433 |
| 5,373,556 | 12/1994 | Johnson .................................. | 379/436 |

OTHER PUBLICATIONS

Mobile Office Magazine's "Cellular Buyers' Guide", pp. 53, 56, 58 and 59, Dec. 1995.

*Primary Examiner*—Jack Chiang
*Attorney, Agent, or Firm*—John G. Rauch

[57] ABSTRACT

A radiotelephone handset (400) is adapted to accommodate a plurality of distinctive telephone appearances. The radiotelephone handset (400) includes a housing (402) having a front housing portion (414) and a rear housing portion (416) and a faceplate (104) attached to the front housing portion and having an outer surface (434) having a distinctive user interface appearance and an inner surface (436). The radiotelephone handset (400) further includes a keypad cover (418) movable between a first position and a second position.

10 Claims, 9 Drawing Sheets

RADIOTELEPHONE HANDSET HAVING A FACEPLATE TO ACCOMMODATE A PLURALITY OF DISTINCTIVE TELEPHONE APPEARANCES

CROSS REFERENCE TO RELATED APPLICATIONS

This is a continuation-in part copending application Ser. No. 29/055,807, filed on May 2, 1996, patent No. D3880.78 which is a continuation-in-part of application Ser. No. 29/052,877 filed on Oct. 17, 1995, now abandoned, and a continuation-in-part of application Ser. No. 08/533,977, tiled on Sep. 26, 1995.

FIELD OF THE INVENTION

The present invention generally relates to portable radiotelephones and, more particularly, to a portable radiotelephone handset having a removable, latching faceplate to accommodate a plurality of distinctive telephone appearances.

BACKGROUND OF THE INVENTION

Portable telephones are generally well-known in the art. Portable telephones includes radiotelephones, such as cellular radiotelephones, cordless radiotelephones and personal communicators. Portable telephones traditionally communicate with a remote base station to provide wireless communications for a user. Portable telephones have become a widely accepted form of wireless communications in the cordless and cellular radiotelephone markets and are rapidly finding applications in new types of communications systems such as personal communications systems (PCS).

Because of such wide acceptance, differentiating the appearance of individual portable telephones has become an important requirement for the customer, the manufacturer, and the distributor of the portable telephone. Customers desire a unique appearance to satisfy their personal tastes and preferences. Manufacturers desire a unique appearance to provide a variety of telephone appearances to their customers, and to provide a unique appearance for the manufacturer's own product. Distributors and retailers desire a unique appearance to differentiate themselves and their products in the marketplace and to promote their name brand. The desires of manufacturers, sellers and users to have a unique-looking portable telephone are eventually communicated to the manufacturer so that the particular unique-looking portable telephone can be produced.

A portable telephone is conventionally produced by assembling radiotelephone circuitry, including transceiver circuitry and user interface circuitry, within a housing. The user interface circuitry includes a display, a keypad, an earpiece and a microphone. The housing traditionally includes a rear housing, having a standard molded form, mated to a front housing having a different standard molded form. The front housing is adapted to provide a particular appearance by means of its molded contour, texture or color. Typically, the user interface elements are mounted inside the front housing and electrically connected to transceiver circuitry mounted in the back housing. The display and keypad may also each have a particular appearance. A particular front housing, a particular display and a particular keypad are selected by the manufacturer to give the portable radiotelephone an overall particular appearance.

A disadvantage of conventionally producing the particular unique appearances of portable radiotelephones is that the unique appearance of a portable radiotelephone must be known by the manufacturer before the portable telephone is manufactured. At selected locations throughout a production line, the appropriate front housing, keypad and display, etc. are appropriately assembled to produce the appropriate particular appearance for the portable telephone.

While this manufacturing technique was acceptable in the past when relatively few particular appearances for portable telephones were needed, the large growth in the telecommunications industry has created a demand for a very large number of unique appearances for portable telephones. Today, a typical manufacturer may be required to track literally hundreds of portable telephone models, each having a unique look. The task of managing such a demand has prompted the need for a new way to manufacture portable telephones to achieve a variety of unique appearances that meet the market demand without burdening the production flow.

Furthermore, convention-ally-produced portable telephones do not permit the user of the portable telephone to alter the appearance of the portable telephone once manufactured or purchased. Aftermarket companies have tried to meet the customer's need for the customer's own unique look by providing accessories, such as cases for holding portable telephones. However, these cases are clumsy, add weight, and have a limited effect on the appearance of the portable telephone.

One known portable telephone design attempts to provide an easily changeable faceplate. This design permits the user to alter the appearance of the portable telephone after manufacture or purchase. The portable telephone includes a removable, snap-fit faceplate and a housing. The snap-fit faceplate includes a lip and tabs which fit into slots on the housing. The manufacturer or user may alter the appearance of this portable telephone by unsnapping the snap-fit faceplate from the housing and substituting another snap-fit faceplate sized to fit the housing.

The success of such a portable phone with a snap-fit faceplate has been limited by the inherently insecure nature of the attachment of the snap-fit faceplate to the housing. The snap-fit faceplate may come loose when the portable telephone is subjected to jarring, such as when the portable telephone is dropped. Moreover, attempts to make the attachment of the snap-fit faceplate more solid by making the snap-fit connection more secure defeat the goal of an easily changeable faceplate.

Other known methods of attaching a faceplate to a portable telephone housing include using one or more screws as well as more permanent methods such as adhesive. None of these known methods has successfully permitted the user to readily alter the appearance of the portable telephone after manufacture or purchase.

Accordingly, there is a need for a portable telephone adapted to accommodate a plurality of distinctive telephone appearances that overcomes the disadvantage of conventionally produced portable telephones.

BRIEF DESCRIPTION OF THE DRAWINGS

The features of the present invention, which are believed to be novel, are set forth with particularity in the appended claims. The invention, together with further objects and advantages thereof, may best be understood by making reference to the following description, taken in conjunction with the accompanying drawings, in the several figures of which like reference numerals identify identical elements, and wherein:

DETAILED DESCRIPTION OF THE PREFERRED EMBODIMENT

Figure 1:
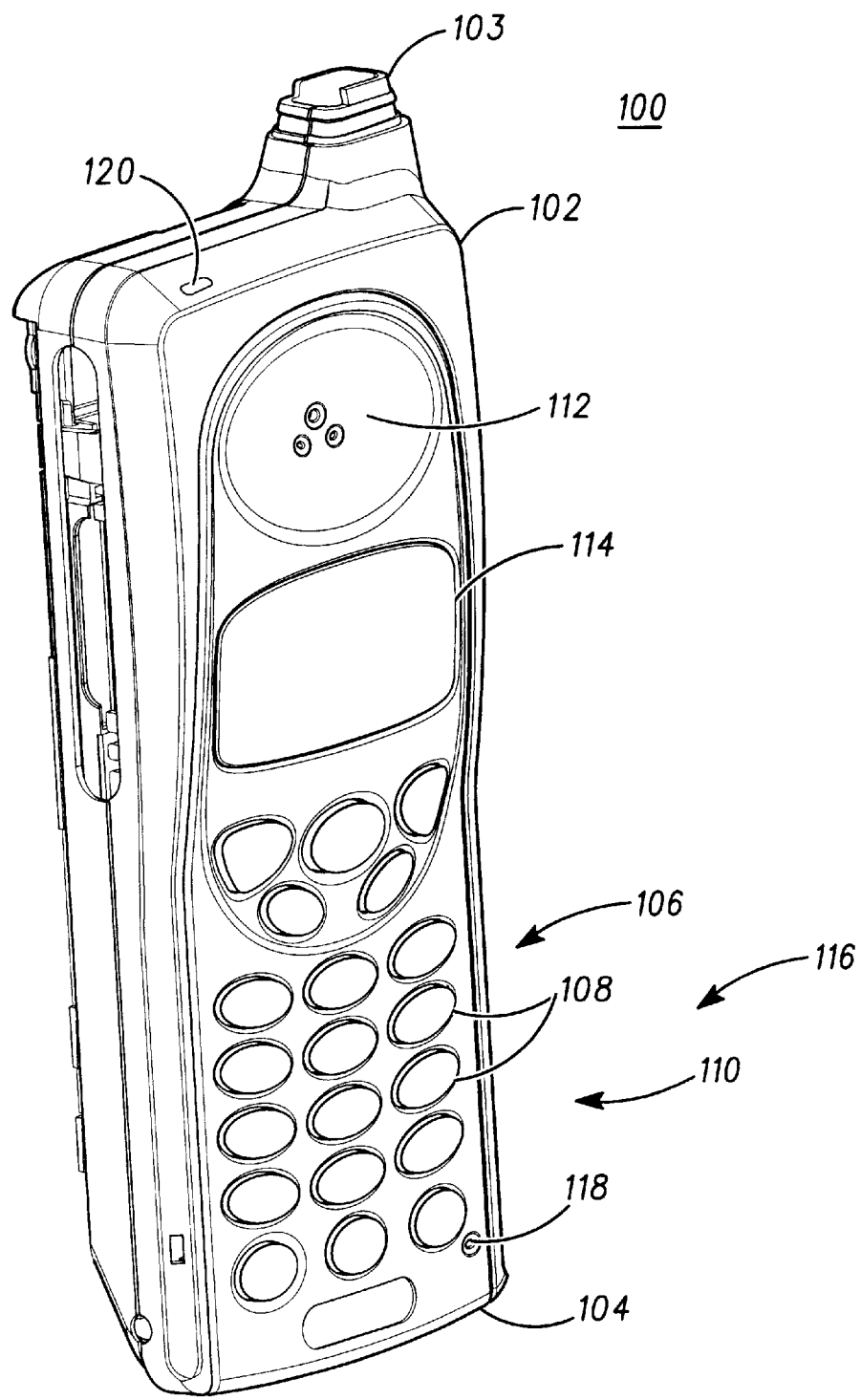
FIG. 1 is a first elevational view of a radiotelephone handset according to the present invention.

Referring now to FIG. 1, it shows a front elevational view of a radiotelephone handset 100 according to the present invention. The radiotelephone handset 100 generally includes a housing 102, a faceplate 104 and a keypad 106 having a plurality 108 of keys. In the preferred embodiment of the present invention, the radiotelephone handset 100 is a cellular radiotelephone handset for operation within a wide-area cellular network. Alternatively, the radiotelephone handset 100 may be a cordless radiotelephone handset, a personal communicator, or any other two-way communication device. The radiotelephone handset 100 is portable in that it is hand held by a user and is available for use virtually anywhere within its corresponding communication system. The handset 100 includes an antenna mount 103 adapted to receive an antenna permitting radio communication within the cellular network.

The radiotelephone handset 100 has a user interface 110 permitting the user to operate the radiotelephone handset 100. The user interface 110 of the radiotelephone handset 100 generally includes an earpiece interface 112, a display interface 114, a keypad interface 116 including the keypad 106, a microphone interface 118 and an alert interface 120. The user interface 110 operates in a conventional manner to provide the user with wireless communications.

According to the present invention, the radiotelephone handset 100 is adapted to accommodate a plurality of distinctive telephone appearances. In the preferred embodiment of the present invention, this is accomplished by the faceplate 104 having a distinctive user interface appearance. The distinctive user interface appearance is evidenced by the distinguished appearance, or unique look, that the faceplate gives to the earpiece interface 112, the display interface 114, the keypad interface 116, and the microphone interface 118.

In the preferred embodiment, the distinctive appearance is accomplished by selecting the contour, shape, size, texture, material and color of the faceplate. Other ways to distinguish the appearance of the faceplate may be readily observable by those skilled in the art of industrial design, mechanical engineering or material engineering. Since the user of the radiotelephone handset 100 typically judges the appearance of the handset 100 based on the user interface 110, modification or replacement of the faceplate 104 provides a convenient way to substantially alter the appearance of the radiotelephone handset 100 with minimum expense and effort.

The housing 102 has a body appearance. In the preferred embodiment of the present invention, the body appearance is a conventionally molded housing having a standard appearance. The standard appearance of the housing 102 is not readily changeable other than surface appearance features such as texture and color and the like. The rationale for this is that the mechanical design of the radiotelephone handset 100 has been carefully designed in order to optimize the radiotelephone handset 100 for space, weight, styling, etc. including ergonomic factors such as the size and positioning of elements of the user interface 110 and the shape and contour of the handset 100. Altering the appearance of the housing 102 to any significant degree would require a substantial effort by the designers and producers of the radiotelephone handset 100.

The housing 102 is adapted to receive the faceplate 104 as one of a plurality of faceplates to provide the distinctive user interface appearance for the radiotelephone handset 100, thereby giving the handset 100 a distinctive telephone appearance. The benefit thus provided is that the handset 100 can easily change appearances simply by attaching different faceplates such as faceplate 104. Therefore, any one of a plurality of faceplates such as faceplate 104 may be readily received by the housing 102 to give the handset 100 a distinguished appearance. Further advantages and features of the present invention will be described in more detail below with reference to FIGS. 2 through 7.

Figure 2:
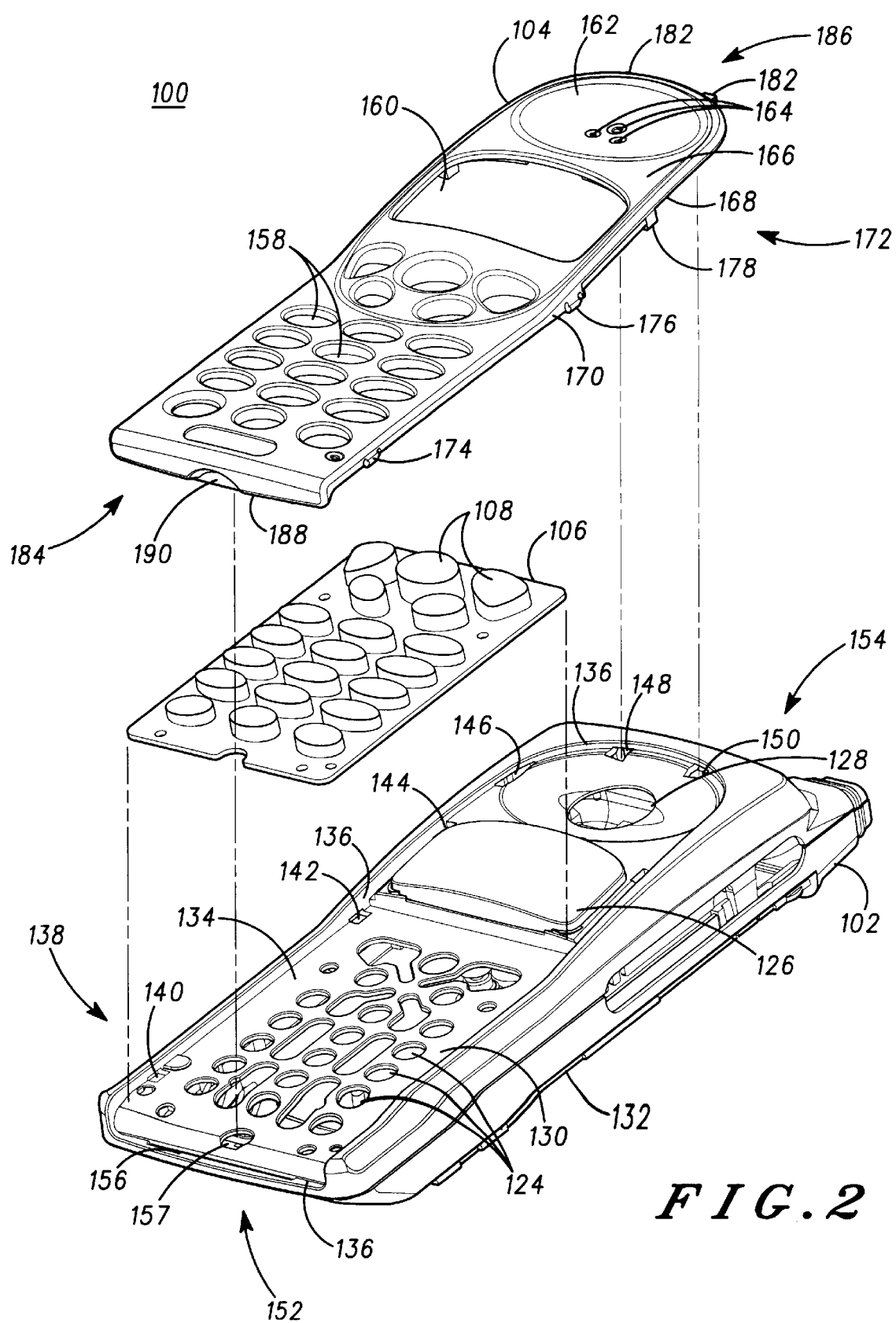
FIG. 2 is a first exploded view of a radiotelephone view of the radiotelephone handset of FIG. 1.

FIG. 2 is a first exploded view of the radiotelephone handset 100 of FIG. 1. The radiotelephone handset 100 of FIG. 2 generally illustrates the housing 102, a keypad 106 and the faceplate 104. In a typical embodiment, the housing 102 contains control circuitry (not shown) providing the operational capabilities of a portable telephone such as a radiotelephone.

The housing 102 includes a plurality 124 of keypad holes, a display lens 126 and an earpiece hole 128. The plurality 124 of keypad holes form a part of the keypad interface 116 and permits electrical and mechanical contact between the individual keys 108 of the keypad 106 and the control circuitry contained within the housing 102. The display lens 126 has a particular appearance and forms a part of the display interface 114 and permits viewing of and protects a display (not shown) controlled by the control circuitry within the housing 102. In the preferred embodiment, the display lens 126 is affixed to the housing 102. In alternative embodiments, the display lens 126 is detachable and may be substituted with another display lens having a different particular appearance. The earpiece hole 128 forms a part of the earpiece interface 112 and permits acoustic coupling between the user's ear and a speaker contained within the housing 102.

The housing 102 includes a front face 130 and a rear face 132. The front face 130 preferably includes a recessed portion 134 defined by a perimeter 136. The front face 130 further includes one or more slots 138. Preferably, the one or more slots 138 include a slot 140, slot 142, slot 144, slot 146, slot 148 and slot 150. Also preferably, the one or more slots 138 includes other slots not visible in FIG. 2 arranged symmetrically with slots 140, 142, 144 and 146 on the front face 130 of the housing 102. The housing 102 has a first end 152 and a second end 154. At the first end 152, the housing 102 preferably includes a slot 156. In accordance with the present invention, the housing 102 includes an aperture 157 at the first end 152. As will be described further in conjunction with FIG. 3, the aperture 157 is adapted to receive a latch pin located on the faceplate 104 for securing the faceplate 104 to the housing 102.

The keypad 106 includes a plurality of keys 108 having a distinctive key appearance. In the preferred embodiment, the keypad 106 is securely attached to the housing 102 as part of the manufacturing process. However, in alternative embodiments, the keypad is detachable from the housing, permitting replacement with another keypad having a different distinctive key appearance.

The faceplate 104 preferably includes a plurality 158 of keyholes, a lens aperture 160 and an ear cup 162. The plurality 158 of keyholes provides tactile access to the keys 108 of the keypad 106 for the user of the radiotelephone handset 100. Each of the keyholes of the plurality 158 of keyholes is sized to accommodate one of the keys 108 of the keypad 106. Similarly, the lens aperture 160 is sized to accommodate the display lens 126 affixed to the housing 102. In this manner, the lens aperture 160 permits easy viewing of the display lens 126. The ear cup 162 includes a plurality 164 of ear holes The ear holes permit acoustic coupling between the earpiece hole 128 of the housing 102 and the user's ear. The ear cup 162 is preferably contoured to maximize acoustic couplin(g.

The faceplate 104 has an outer surface 166, an inner surface 168 and a perimeter 170. Extending from the inner surface 168 along the perimeter 170, the faceplate 104 includes one or more tabs 172 including tabs 174, 176, 178, 180 and 182. Also preferably, the one or more tabs 172 includes tabs not visible in FIG. 2 arranged symmetrically with tabs 174, 176, 178 on the inner surface 168 of the faceplate 104. The faceplate 104 has a first end 184 and a second end 186. Extending from the inner surface 168 of the faceplate 104 at the first end 184 is a tongue 188. The faceplate 104 preferably includes a finger slot 190.

The faceplate 104 may be removable attached to the housing 102 by inserting the one or more tabs 172 into corresponding slots of the one or more slots 138 in a snap-fit connection. Similarly, the tongue 188 of the faceplate 104 may be inserted in the slot 156 at the first end of the housing 102. By engagement of the one or more tabs 172 extending from the faceplate 104 with the one or more slots 138 in the housing 102, the faceplate 104 is maintained snugly against the front face 130 of the housing 102. The perimeter 170 of the faceplate 104 is configured to conform to the perimeter 136 of the recessed portion 134 of the front face 130 of housing 102. In this manner, the housing 102 receives the faceplate as one of a plurality of faceplates to provide a distinctive user interface appearance for the radiotelephone handset, thereby giving the radiotelephone handset one distinctive telephone appearance of a plurality of distinctive telephone appearances.

Figure 3:
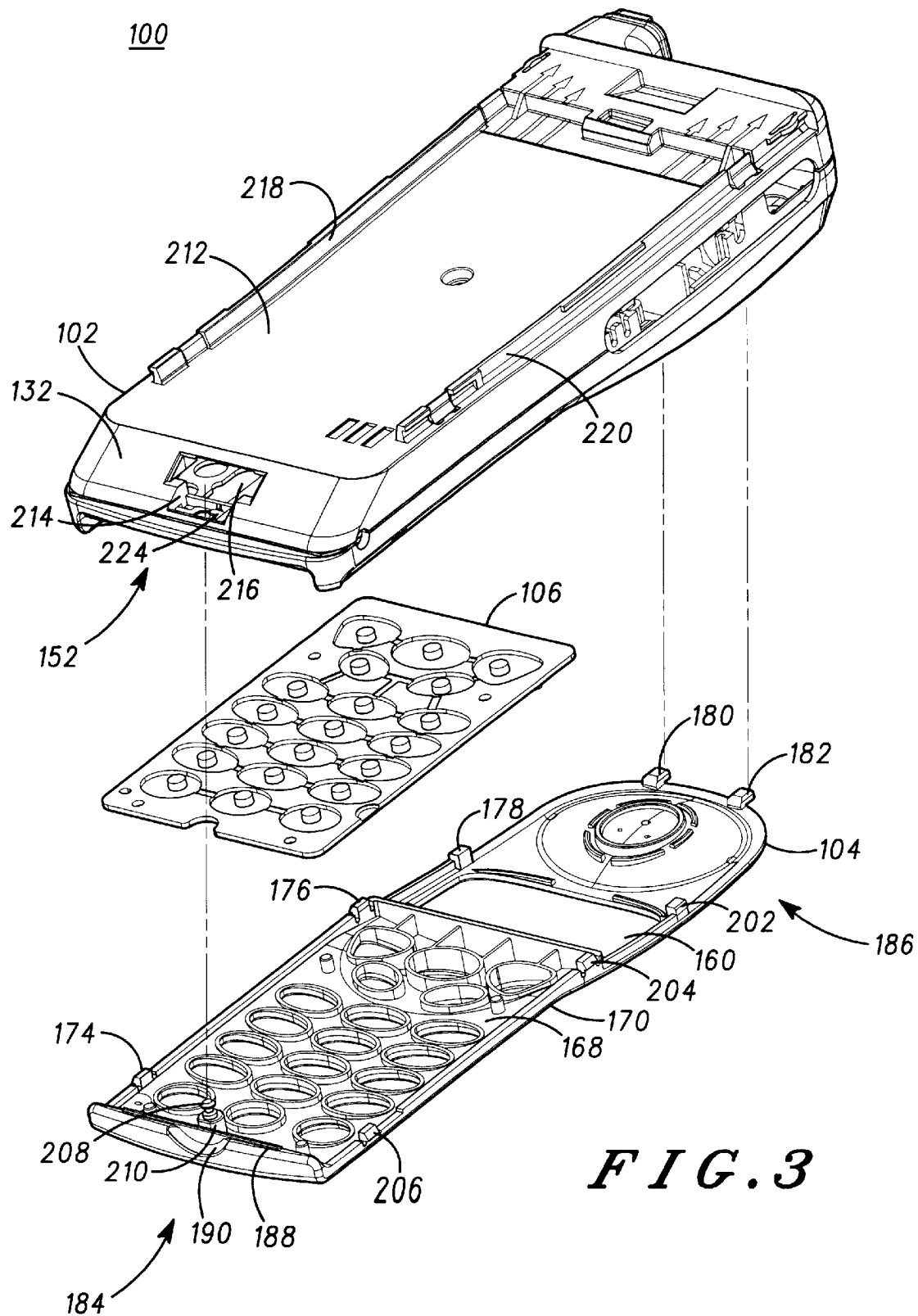
FIG. 3 is a second exploded view of the radiotelephone handset of FIG. 1.

Referring now to FIG. 3, it shows a second exploded view of the radiotelephone handset 100 of FIG. 1. FIG. 3 further illustrates the housing 102, the faceplate 104 and the keypad 106. In FIG. 3, the one or more tabs 172 arranged along the inner surface 168 of the faceplate 104 are visible. As shown in FIG. 2, the one or more tabs 172 include tabs 174, 176, 178, 180 and 182. In FIG. 3, the one or more tabs 172 also includes tabs 202, 204 and 206.

As is further illustrated in FIG. 3, the faceplate 104 includes a latch pin 208 extending from the inner surface 168. In the preferred embodiment, the faceplate 104 includes a post 210 located on the inner surface 168 at the first end 184. Preferably, the post 210 is a molded portion of the faceplate 104. The post 210 includes an aperture configured to receive the latch pin 208 and securely retain the latch pin 208 by friction, adhesive or other means. Alternatively, the latch pin 208 may be integrally formed with the faceplate 104, as by injection molding, or by any other appropriate method.

The housing 102 includes a battery receiving portion 212, a channel 214 and a receptacle 216. The radiotelephone handset 100 generally includes control circuitry contained within the housing 102 which operates in response to electrical power provided by a battery (not shown). The housing 102 is configured to securely receive the battery attached to the rear face 132 at the battery receiving portion 212. To secure the battery to the rear face 132, the battery receiving portion 212 includes slide rails 218 and 220. The housing includes contact apertures 222 for permitting electrical contact between the battery and the control circuitry contained within the housing. The receptacle 216 is configured to receive a plug (not shown) which provides electrical contact to the control circuitry of the handset 100, for example, for recharging the battery or for providing operating power from an AC adapter.

The rear face 132 of the housing 102 further includes a channel 214 at the first end 152. Recessed within the channel 214 is a latch keeper 224. As will be discussed further in conjunction with FIGS. 4–7, the latch keeper 224, is configured to releasably engage the latch pin 208 to securely retain the faceplate 104 as a unitary assembly with the housing 102.

Figure 4:
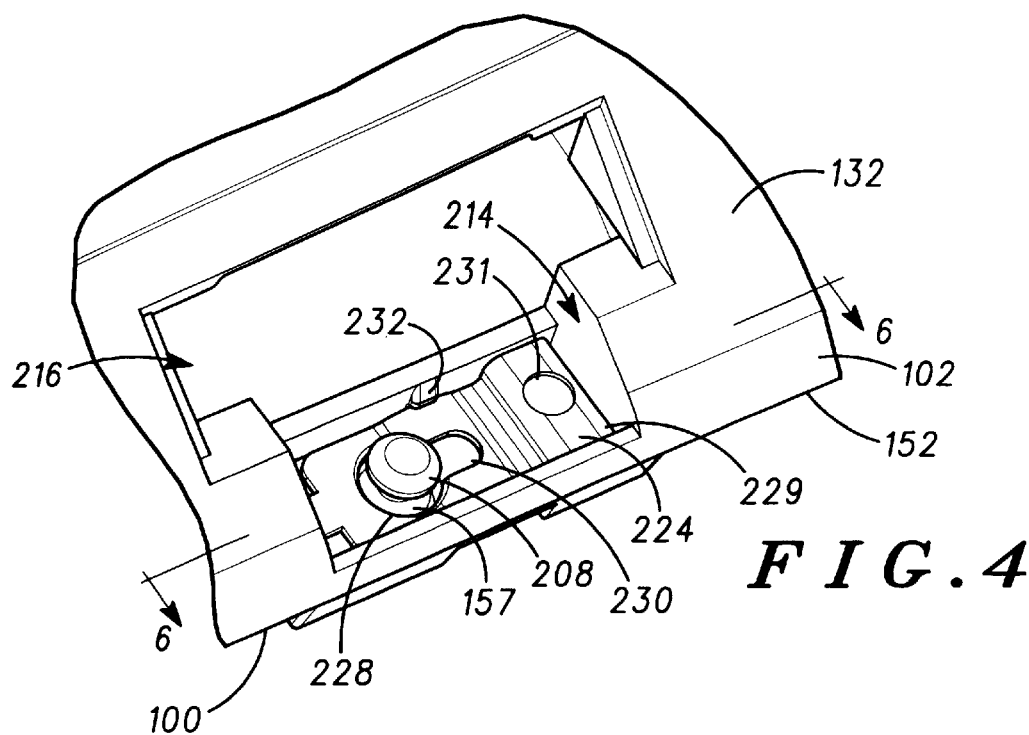
FIG. 4 is a first detail view of a portion of the radiotelephone handset of FIG. 1.

Referring now FIG. 4, it shows a first detailed view of a portion of the radiotelephone handset 100 of FIG. 1. In FIG. 4, the channel 214 is formed in the rear face 132 of the housing 102. Recessed within the channel 214 is the latch keeper 224. The latch keeper is preferably formed from metal or other suitably strong, rigid material.

The latch keeper 224 preferably includes a substantially flat arm 226 having a first aperture 228 and a second aperture 230 and an upright portion 229 having a third aperture 231. When the housing 102 receives the faceplate 104, the latch pin 208 extends through the aperture 157 (not shown) in the front face 130 of the housing 102. The first aperture 228 of the latch keeper 224 is sized to receive a portion of the latch pin 208 when the latch pin extends through the aperture 157. The second aperture 230 is contiguous with the first aperture 228 and sized to retain the portion of the latch pin 208.

Figure 5:
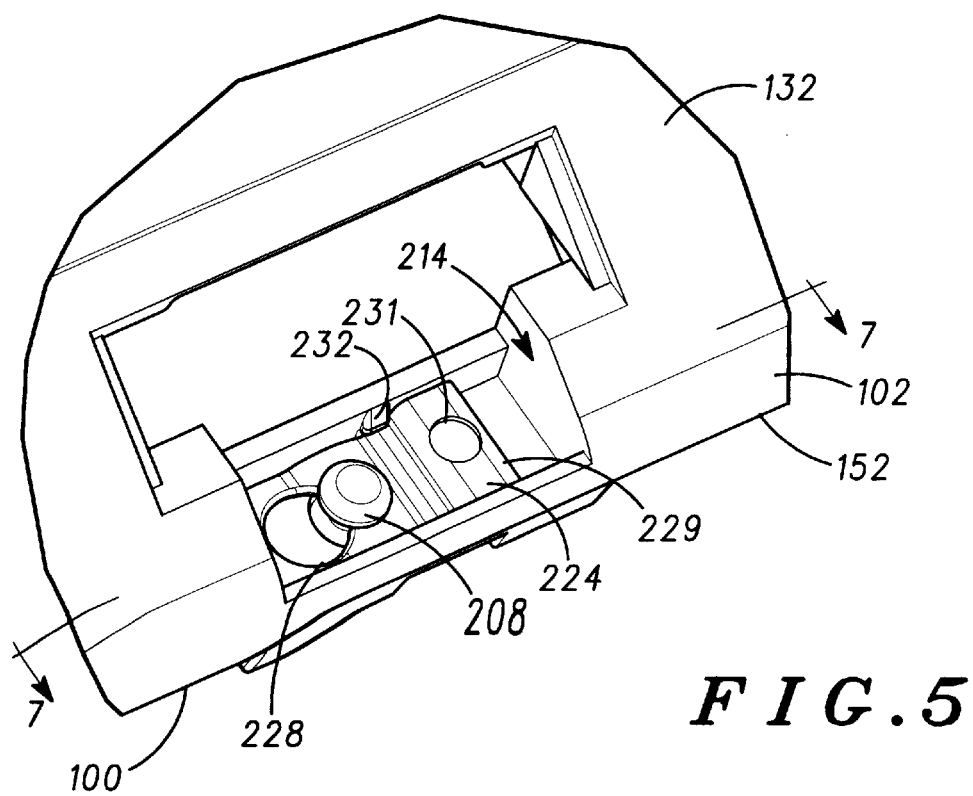
FIG. 5 is a second detail view of a portion of the radiotelephone handset of FIG. 1.

FIG. 5 is a second detailed view of a portion of the radiotelephone handset 100 of FIG. 1. According to the present invention, the latch keeper is slideable between a release position illustrated in FIG. 4 and a lock position illustrated in FIG. 5. In FIG. 5, the latch keeper 224 has been moved from the position illustrated in FIG. 4 in order to securely engage and retain the latch pin 208. In the release position, the first aperture 228 aligns with the aperture 157 in the housing 102 (FIG. 2) to receive the latch pin inserted through the aperture 157. In the lock position, the second aperture 230 aligns with the aperture 157. The third aperture 231 is configured to receive the tip of a pen, pencil or other instrument to facilitate sliding the latch keeper 224 between the lock position and the release position.

As can be seen in FIGS. 4 and 5, the channel 214 includes one or more retainers, such as retainer 232. Retainer 232 retains the latch keeper 224 in the channel 214 while permitting sliding movement between the release position for releasing the latch pin 208 (FIG. 4) and the lock position for locking the latch pin 208 (FIG. 5). The latch pin 208 and the latch keeper 224 form a latch 209. It will be understood by those skilled in the art that the latch 209 could be formed using different elements which still provide the function of securing the faceplate 104 to the housing 102.

Figure 6:
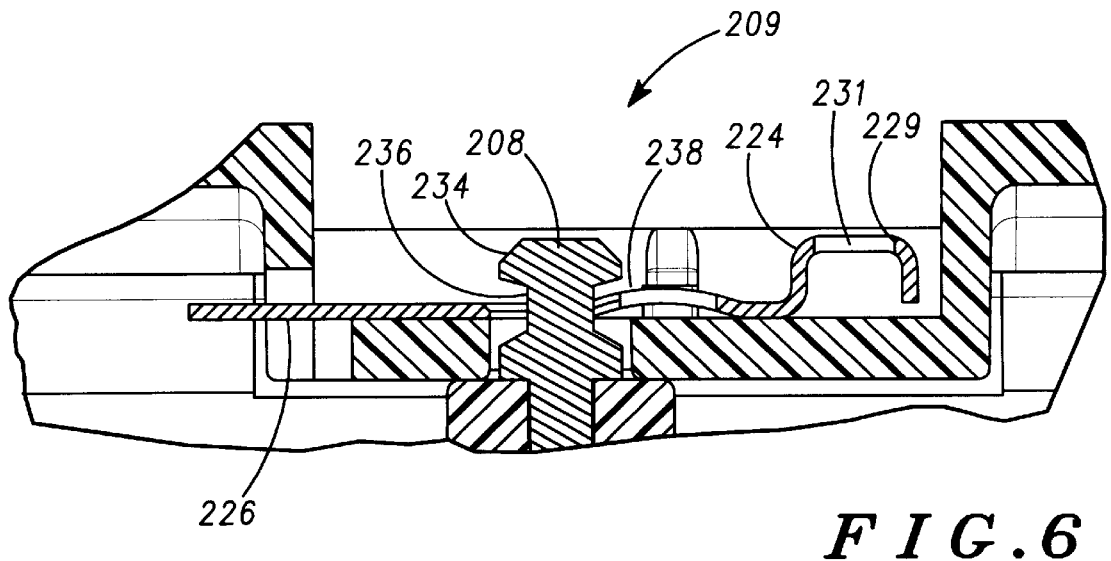
FIG. 6 is a cross-sectional view taken along line 6–6' in FIG. 4.
Figure 7:
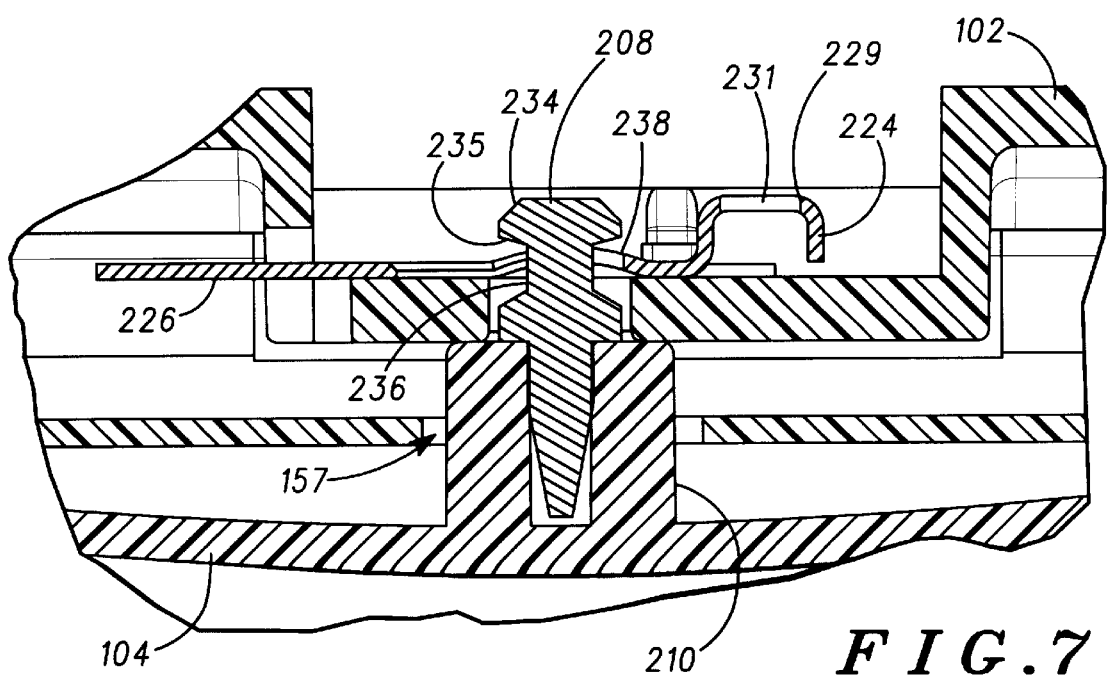
FIG. 7 is a cross-sectional view taken along line 7–7' in FIG. 5.

FIG. 6 is a cross-sectional view taken along line 6–6' in FIG. 4. FIG. 7 is a cross-sectional view taken along line 7–7' in FIG. 5. In FIGS. 6 and 7, it can be seen that the latch pin 208 includes a cap 234 having a seat portion 235 and a neck 236. The neck has a neck diameter and the cap has a cap diameter. The cap diameter is larger than the neck diameter so that when the latch keeper 224 is in the latched position (FIGS. 5 and 7) the neck 236 is engaged by the second aperture 230 to retain the latch pin 208 within the latch keeper 224.

Preferably, substantially flat arm 226 of the latch keeper 224 includes an arcuate portion 238. The arcuate portion 238 is preferably slightly flexible as may be achieved if the latch keeper 224 is fabricated from a flexible material, such as thin metal. When the latch keeper 224 is moved to the lock position (FIG. 7), the arcuate portion 238 engages the seat portion 235 of the cap 234 of the latch pin 208. In this manner, the arcuate portion 238 forms a bias element for asserting a bias force between the latch pill 208 and the housing 102 when the latch keeper 224 is in the lock position. This bias force serves to snugly retain the latch pin 208 and to prevent the latch keeper 224 from inadvertently sliding from the locked position to the release position (FIG. 6).

With the latch keeper 224 in the locked position, the faceplate 104 will remain secured to the housing 102, even if the handset 100 is dropped or otherwise jarred. The latch 209 formed by the latch pin 208 and the latch keeper 224 operates to additionally retain the faceplate 104 to the housing 102, supplementing the mechanical connection provided by the one or more tabs 172 and the one or more slots 138. Unlike the apparatus provided by a tab-and-slot retainer, the latch 209 is a configurable latch in that it may be moved between a release configuration and a lock configuration. In the release configuration, the faceplate 104 may be readily removed and replaced. In the lock configuration, the faceplate 104 is secured to the housing 102.

Since the faceplate 104 and the keypad 106 may be attached to the housing 102 at various points in time throughout the distribution chain, it is conceived that the faceplate 104 alone or in combination with the keypad 106 may be sold as a user interface kit. Such a kit would be available to the user for a specific selection at a distribution outlet, a retail store, or by mail order, thereby allowing the user to initially use a distinctive appearance or to change the faceplate and choose another distinctive appearance at a later time.

Figure 8:
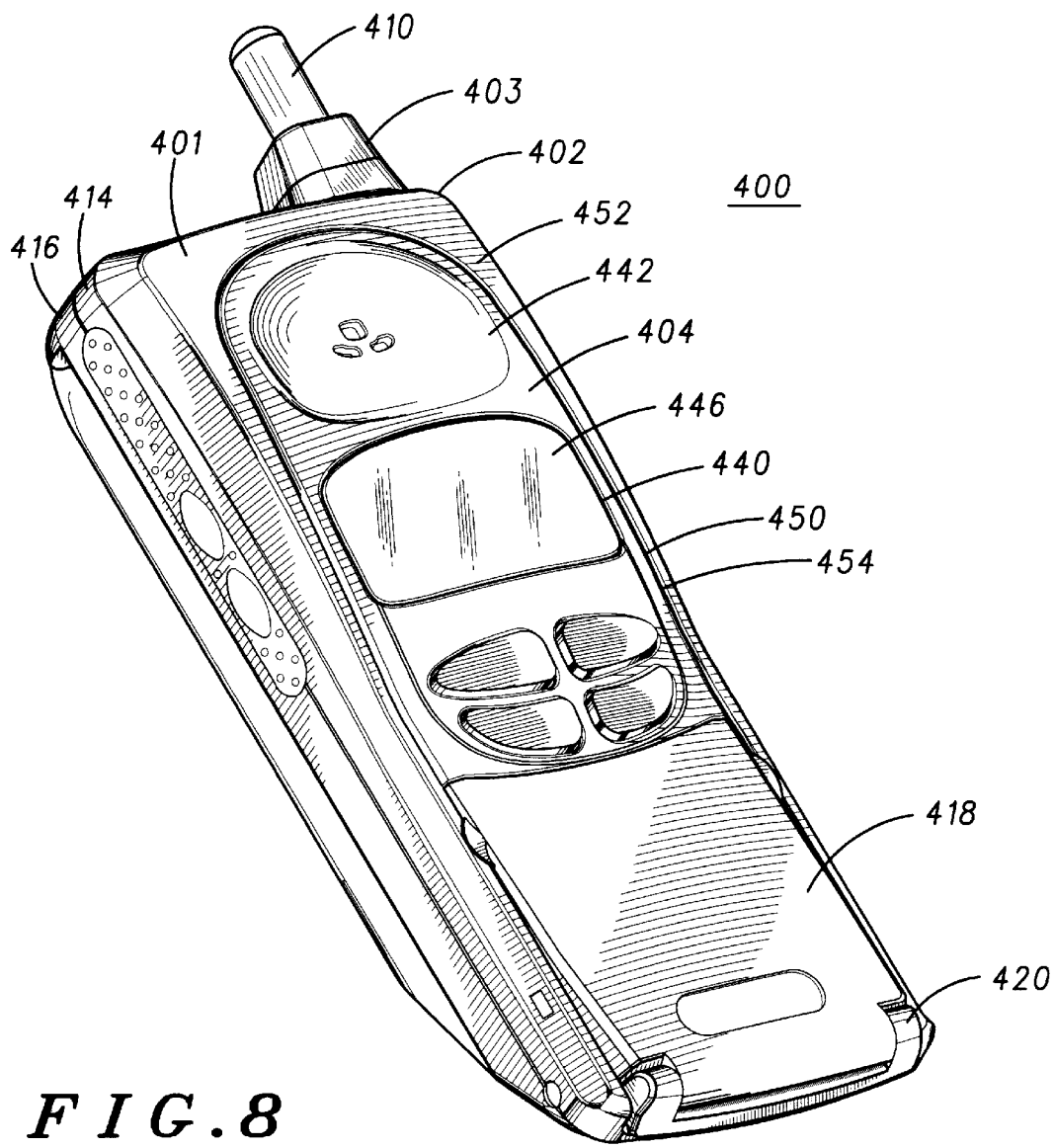
FIG. 8 is a first elevational view of an alternative embodiment of the radiotelephone handset of FIG. 1.
Figure 9:
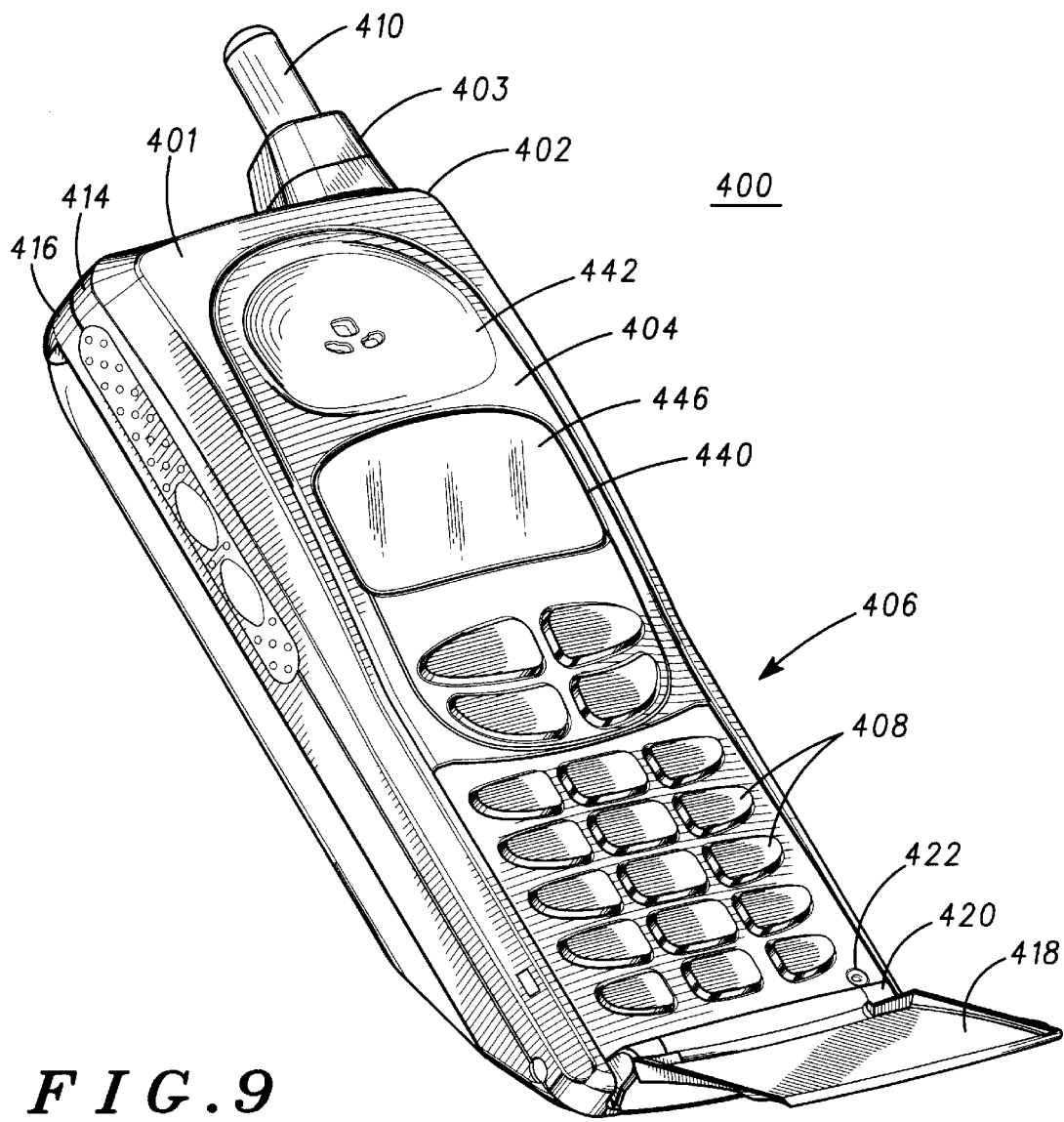
FIG. 9 is a second elevational view of the alternative embodiment of the radiotelephone handset of FIG. 8.

Referring to FIGS. 8–9, they show a second embodiment of the radiotelephone handset 400. The radiotelephone handset 400 generally includes a housing 402 having a front face 401, a faceplate 404 and a keypad 406 disposed on the front face of the housing, the keypad 406 having a plurality 408 of keys. The handset 400 includes an antenna mount 403 adapted to receive an antenna 410 permitting radio communication within a cellular network. The housing 402 includes a front housing portion 414 and a rear housing portion 416. The housing 402 illustrated in FIGS. 8–9 is substantially identical to the housing illustrated in FIGS. 1–7. The radiotelephone handset 400 comprises a portable radio configured for radio communication with a remote transceiver.

In accordance with the present invention, the radiotelephone handset 400 includes a keypad cover 418 movable between a first position (FIG. 8) and a second position (FIG. 9). The keypad cover 418 covers a portion of the keypad 406 in the first position and the keypad cover 418 exposes a portion of the keypad 406 in the second position. Alternatively, the keypad cover 418 may be extended to cover a portion of the front housing in the first position. Thus, the keypad cover 418 covers one of a portion of the faceplate 104 and the front housing portion in the first position.

The radiotelephone handset 400 further comprises a hinge 420 for rotational movement of the keypad cover 418 between the first position and the second position. In the illustrated embodiment, the hinge 420 rotatably couples the keypad cover 418 to the faceplate 404 and the keypad cover 418 and hinge 420 are integrally formed with the faceplate 404. however, the hinge 420 could be located in other suitable locations, such as in a position coupling the keypad cover 418 to the front housing portion 414.

In the illustrated embodiment, the keypad cover 418 comprises a hinged flap which covers the keys 408 of the keypad 406 in the first position. However, it is to be understood that other types of keypad covers, such as those which move in a translational direction, may be substituted for the illustrated embodiment.

The keypad cover 418 provides additional user convenience not available in other radiotelephone handsets, such as the embodiment illustrated in FIG. 1. For example, a user may close the keypad cover by moving it from the second position to the first position. In the first position, the keys 408 are protected from inadvertent actuations. Also, the keys 408 are protected from water, dirt and other contaminants when the keypad cover 418 is in the first position. When the keypad cover 418 is open, or in the second position, the keypad cover 418 operates to direct sound waves from the user's mouth toward a microphone 422 located on the front face 401. The keypad cover 418 also operates to shield a portion of the user's face, including the mouth, when in the second position, thereby providing the user with a feeling of privacy when speaking during a phone call.

Referring to FIGS. 10–14, the faceplate 404 includes a body 428 configured for removable attachment to the housing 402 of a communication device such as the radiotelephone handset 400 and a keypad cover 418 movably coupled to the body 428. Alternatively, the keypad cover 418 may be omitted from the faceplate 404 and form a separate element. The faceplate 404 has a first end 430 and a second end 432. The faceplate 404 further includes a hinge 420 disposed at the first end 430 of the body 428 coupling the keypad cover 418 to the faceplate 404 to provide rotational movement of the keypad cover 418 between the first position and the second position.

The faceplate 404 includes an outer surface 434 and an inner surface 436 and a perimeter 435. The outer surface 434 defines a plurality of keyholes 438. Each keyhole is sized to receive a key 408 of the keypad 406 when the faceplate 404 and the keypad 406 are attached to the housing 402. In FIGS. 10–13, the faceplate 404 is shown with the keypad 406 engaging the faceplate 404.

The faceplate 404 preferably includes an aperture 440, an ear cup 442 and a microphone aperture 444. The housing 402 includes a display lens 446 (FIG. 9). The aperture 440 is sized to accommodate the display lens when the faceplate 404 is attached to the housing 402. The ear cup 442 includes a plurality 448 of ear holes which permit acoustic coupling between earpiece hole 128 (FIG. 2) of the housing 402 and the user's ear.

Figures 10, 11:
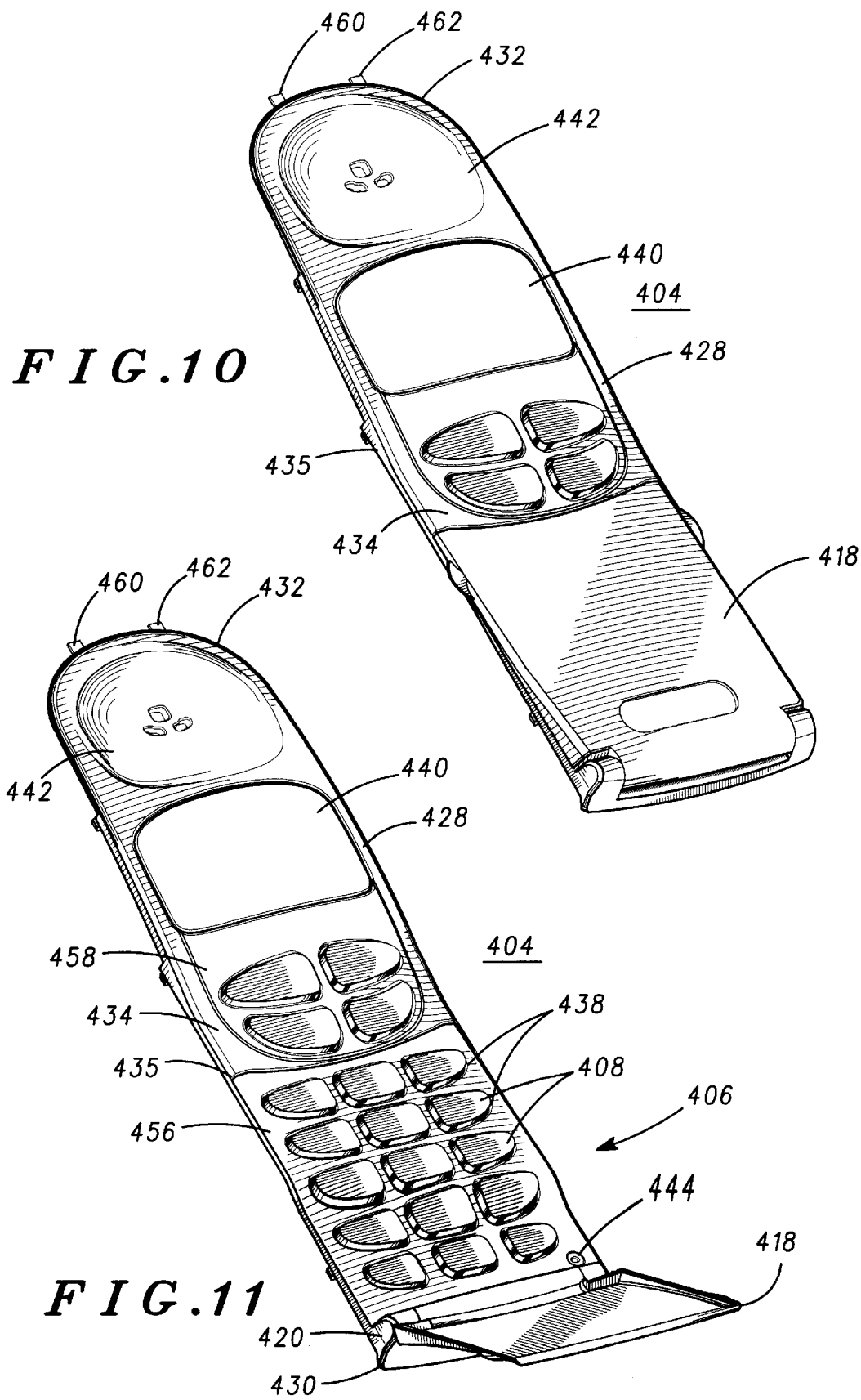
FIG. 10 is an isometric view of a faceplate for use with the radiotelephone handset of FIGS. 9–10 showing a keypad cover in a closed position.
FIG. 11 is an isometric view of the faceplate of FIG. 10 showing the keypad cover in an open position.
Figure 12:
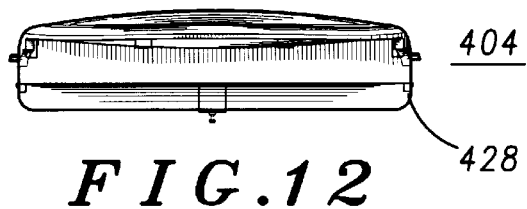
FIG. 12 is a bottom view of the faceplate of FIG. 40.
Figure 13:
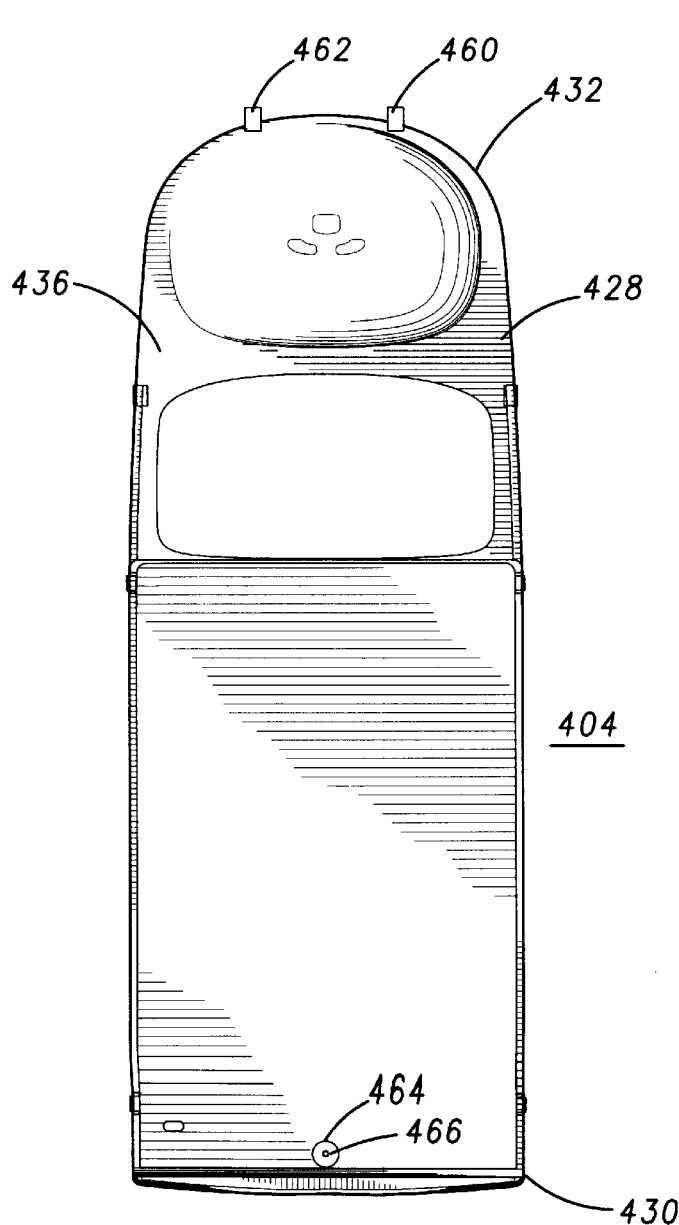
FIG. 13 is a rear elevational view of the faceplate of FIG. 10.
Figure 14:
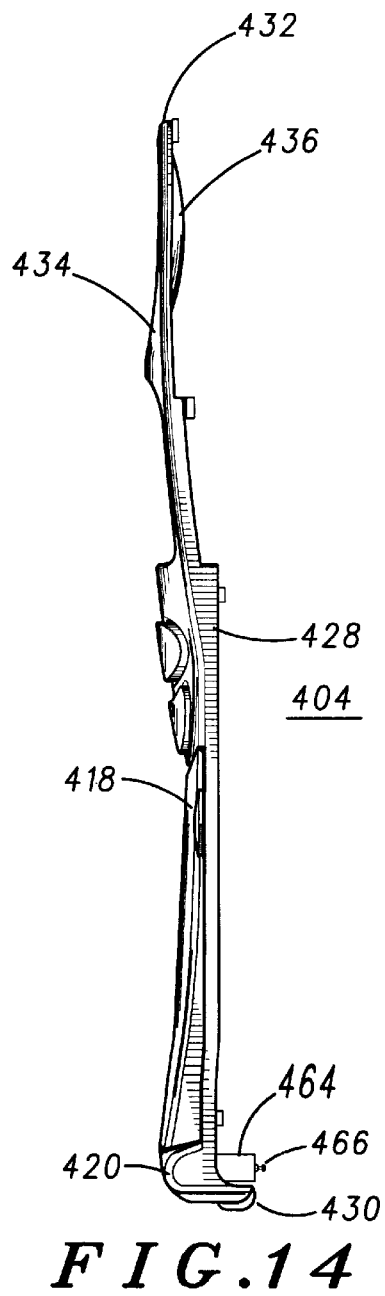
FIG. 14 is a right side elevation-al view of the faceplate of FIG. 10.

The front face 401 of the housing 402 defines a recessed portion 450 and a non-recessed portion 452, separated by a perimeter 454. The recessed portion 450 is sized and shaped to receive the faceplate 404, thereby providing a substantially flush fit between the outer surface 434 of the faceplate 404 and the non-recessed portion 452. Similarly, the outer surface 434 of the faceplate 404 defines a recessed portion 456 and a non-recessed portion 458 (FIG. 11). The recessed portion 456 is sized to receive the keypad cover 418 when the keypad cover 418 is in the first position, thereby providing a substantially flush fit between the keypad cover 418 and the non-recessed portion 458 of the outer surface 434. The flush fit between the keypad cover 418 and the faceplate 404 and between the faceplate 404 and the housing 402 ensure a smooth, attractive appearance. Of course, other appearances and design choices may also be accommodated.

Preferably, the faceplate 404 is configured for removable attachment to the front housing portion 414. To provide this capability, the faceplate has tabs 460, 462 at the second end 432 which are insertable into corresponding slots 148, 150 of the housing 102 (FIG. 2). Further, the faceplate 404 preferably includes a post 464 located in the inner surface 436 and a latch pin 466 extending therefrom. The latch pin 466 is positioned to engage a latch keeper such as latch keeper 224 of the housing 402 (FIG. 3) to securely retain the faceplate on the front face 401 of the housing 402. Thus, the radiotelephone handset includes a configurable latch for releasably securing the faceplate to the housing, the configurable latch including the latch pin 466 and the latch keeper 224. In alternative embodiments, the configurable latch may be omitted and the faceplate 404 retained on the housing 402 by snap fitting or by other means. Also, the faceplate 404 may be permanently attached to the housing 402 at the time of manufacture, with the faceplate chosen to customize the appearance of the radiotelephone handset 400 when assembled with the standard housing 402.

It is envisioned that the radiotelephone handset 400 may be provided to a user in a complete package. As packaged, the radiotelephone handset 400 includes a standard housing, such as housing 402, having a standard appearance, a keypad configured to be disposed on the front face 401 of the housing 402, and a plurality of faceplates such as faceplate 404 and faceplate 104 (FIG. 2). Each faceplate is configured for removable attachment to the front face of the standard housing 402 for customizing the appearance of the radiotelephone handset 400. At least one faceplate of the plurality of faceplates, such as faceplate 404, has a keypad cover 418 movable between a first position and a second position. The keypad cover 418 covers a portion of the keypad in the first position and exposes a portion of the keypad in the second position. In their profile, each faceplate is identical to make them interchangeable. Each faceplate has an outer perimeter 435 configured to conform to the perimeter 454 of the recessed portion 450 of the housing 402.

From the foregoing, it can be seen that the present invention provides a radiotelephone handset adapted to accommodate a plurality of distinctive telephone appearances. The handset includes a housing adapted to receive a faceplate as one of a plurality of faceplates to provide a distinctive user interface appearance for the handset. The faceplate includes a latch pin extending from an inner surface to be engaged by a latch keeper located on the radiotelephone housing. The latch keeper allows the faceplate to be snugly retained against the housing or to be released and exchanged with another faceplate. A kit including the faceplate and a keypad for the radiotelephone handset may be separately combined and sold to provide an alternative user interface appearance for the handset.

While a particular embodiment of the present invention has been shown and described, modifications may be made. For example, the latch may be formed using different components, or the latch pin may extend from the housing to be engaged by the faceplate, rather than extending from the faceplate to be engaged by the housing, or the latch pin may extend from the perimeter of the housing rather than an inner surface. Moreover, the tabs and slots may be replaced with alternative means for engaging the faceplate with the housing or may be eliminated entirely. It is therefore intended in the appended claims to cover all such changes and modifications which fall within the true spirit and scope of the invention.

What is claimed is:

1. A portable radiotelephone handset comprising:
   a standard housing having a front face and having a housing attachment structure;
   a keypad configured to be disposed on the front face; and
   a plurality of faceplates,
      each faceplate of the plurality of faceplates configured for removable attachment to the front face of the standard housing,
      each faceplate of the plurality of faceplates removable to permit replacement of the each faceplate by another faceplate of the plurality of faceplates for customizing appearance of the portable radiotelephone handset,
      each faceplate of the plurality of faceplates having a substantially identical faceplate attachment structure configured to engage the housing attachment structure to securely retain the each faceplate of the plurality of faceplates to the front face of the standard housing,
      at least one faceplate of the plurality of faceplates having a keypad cover movable between a first position and a second position, the keypad cover covering a portion of the keypad in the first position and exposing the portion of the keypad in the second position.

2. A portable radiotelephone handset as recited in claim 1 wherein the at least one faceplate of the plurality of faceplates further comprises a body and a hinge coupling the keypad cover and the body, the hinge providing rotational movement of the keypad cover between the first position and the second position.

3. A portable radiotelephone handset as recited in claim 1 wherein the front face includes a recessed portion defined by a perimeter and a nonrecessed portion, and wherein each faceplate of the plurality of faceplates has an outer perimeter configured to conform to the perimeter of the recessed portion to provide a substantially flush fit between the faceplate and the non-recessed portion.

4. A portable radio comprising:
   a housing having a front housing portion and a rear housing portion, the front housing portion including a housing attachment structure;
   a keypad including a plurality of keys configured for attachment to the front housing portion;

a faceplate removably attached to the front housing portion to permit replacement of the faceplate by another faceplate, the faceplate including a faceplate attachment structure and the other faceplate including a substantially identical faceplate attachment structure, each faceplate attachment structure being configured to releasably engage the housing attachment structure, the faceplate including:

a first end and a second end;

an outer surface defining a plurality of keyholes, each keyhole sized to receive a key when the faceplate and the keypad are attached to the front housing portion;

a keypad cover disposed at the first end of the faceplate, the keypad cover movable between a first position and a second position; and a hinge coupling the keypad cover to the faceplate.

5. A portable radio as recited in claim 4 further comprising a display lens disposed on the front housing portion, the outer surface of the faceplate defining an aperture sized to receive the display lens when the faceplate is attached to the front housing portion.

6. A portable radio as recited in claim 4 wherein the keypad is removably attached to the front housing portion to permit replacement of the keypad by the other keypad.

7. A portable radio as recited in claim 5 further comprising a configurable latch for releasably securing the faceplate to the front housing portion.

8. A portable radiotelephone handset as recited in claim 1 wherein the faceplate attachment structure comprises a plurality of tabs arranged at a perimeter of the each faceplate of the plurality of faceplates and the housing attachment structure comprises a like plurality of slots positioned to receive the plurality of tabs.

9. A method for varying the appearance of a portable radio, the method comprising the steps of:

providing a housing having a front face, a keypad disposed on the front face and a housing attachment structure;

attaching to the front face of the housing a first faceplate, the first faceplate having a unique first appearance and a faceplate attachment structure which is configured to releasably engage the housing attachment structure;

at the convenience of a user of the portable radio, removing from the housing the first faceplate; and replacing the first faceplate with a second faceplate having a unique second appearance, the second faceplate having the faceplate attachment structure for releasably engaging the housing attachment structure, at least one of the first faceplate and the second faceplate having a keypad cover which covers a portion of the keypad when the at least one of the first faceplate and the second faceplate is disposed on the front face of the housing.

10. A method as recited in claim 9 wherein replacing the first faceplate with the second faceplate comprises the steps of:

locating a plurality of slots of the front face of the housing;

removing a like plurality of tabs on the first faceplate from the plurality of slots on the front face of the housing to remove the first faceplate;

inserting a like plurality of tabs on the second faceplate in the plurality of slots to attach the second faceplate.

* * * * *